March 18, 1969 G. A. MEDER 3,433,446
FISHING REEL DISPLAY BRACKET
Filed Nov. 15, 1966
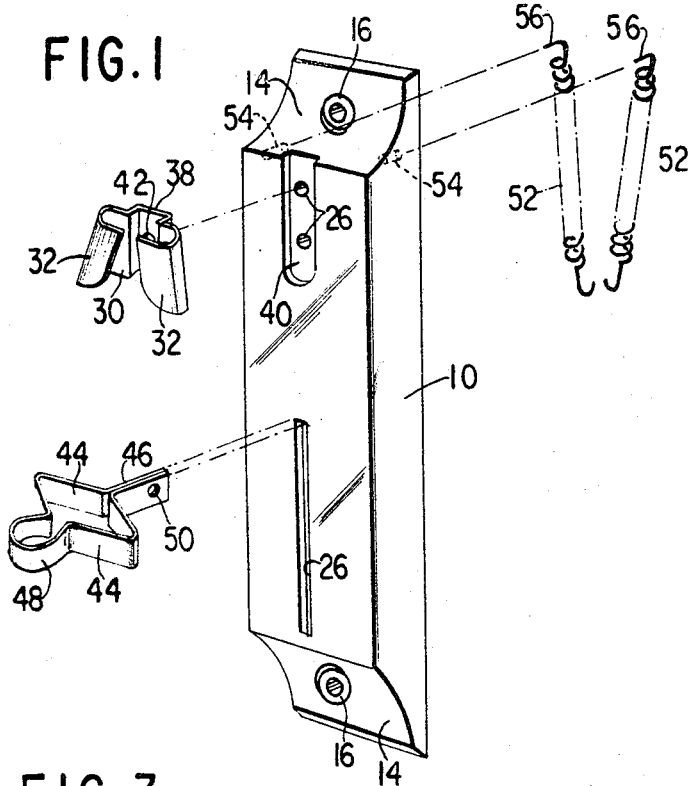
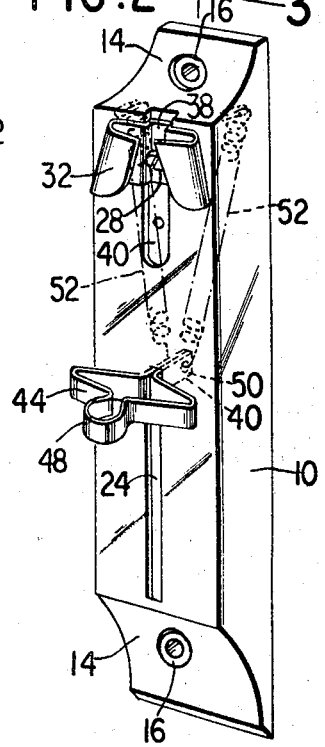
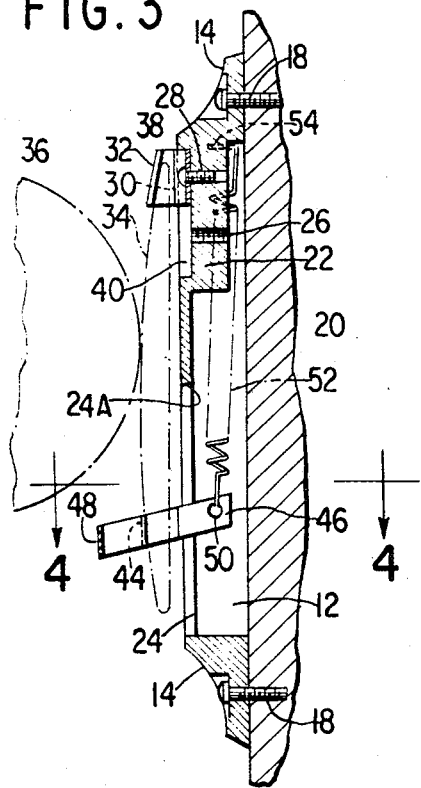
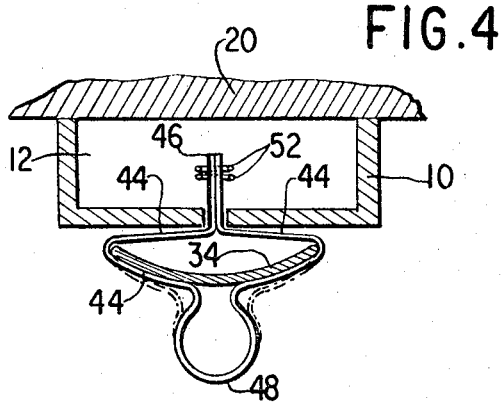
INVENTOR
GEORGE A. MEDER
BY
Smythe & Moore
ATTORNEY

United States Patent Office 3,433,446
Patented Mar. 18, 1969

3,433,446
FISHING REEL DISPLAY BRACKET
George A. Meder, 37 Sunnyridge Road,
Easton, Conn. 06425
Filed Nov. 15, 1966, Ser. No. 594,512
U.S. Cl. 248—316
Int. Cl. A47h *1/10;* A47f *5/00*
7 Claims

ABSTRACT OF THE DISCLOSURE

A bracket for mounting fishing rod reels on a display panel or wall including an elongated substantially flat slotted base, with a reel base plate tongue keeper adjustably attached to one end thereof and a second keeper mounted in said slot. A spring is attached at one end to one end of the base and at its opposing end to the second keeper for resiliently urging the latter toward the first keeper to retain the reel base plate tongues in clamped position on the base.

---

This invention relates to a bracket or holder for fishing rod reels or the like and more particularly to a bracket for mounting such reels on a wall or panel for display purposes.

While various types of reel brackets have been previously proposed, especially for mounting the reel on a fishing rod, they are not adapted for ready mounting of reels of various sizes on a display panel.

An object of the present invention, therefore, is to provide a bracket for fishing reels or the like which is readily adaptable for mounting reels of various sizes and types on a display panel or the like.

A further object is to provide a reel bracket or mount in which flexible clips or keeper members, readily adjustable to reel base plates of various lengths, provide for accommodating base plates of various contours or shapes.

Another object is to provide a reel mount in which one of the keeper members is both slidably and rockably mounted in a longitudinally extending slot positively to clamp a reel plate tongue.

A further object is to provide a reel mount in which a spring means under tension and concealed within a recess in a base member provides for resiliently urging one keeper member towards another.

A still further object is to provide a new and improved reel mount for display purposes which is simple in construction, inexpensive to manufacture, and attractive in appearance with or without a reel in place.

In one aspect of the invention, the bracket or mount comprises a rectangular base member provided with a recessed hollow core or interior and a longitudinally extending slot communicating with the hollow core. A spring clip or keeper member adapted to receive one end or tongue of reel base plates of various contours or shapes is adjustably but fixedly mounted towards one end of the base member. A second spring clip or keeper loop adapted to receive and accommodate the other end or tongue of such reel base plates has a leg or projecting part extending through the slot in the base member. A spring means, adapted to be under tension upon movement of the clips away from each other, is attached to the leg of the second clip within the hollow interior of the base member, the foregoing structure being such that the second clip is slidably and rockably movable within the aforesaid slot to receive and to clamp a reel base plate under tension on the base member.

The above and other objects, features and advantages of the invention will become apparent from the following description taken in conjunction with the accompanying drawings which are merely exemplary.

In the drawings:

FIG. 1 is an exploded perspective view of a reel mount constructed in accordance with the present invention;

FIG. 2 is a perspective view of the assembled reel mount;

FIG. 3 is a longitudinal sectional view through the reel mount of FIG. 2 taken on the line 3—3 of FIG. 2; and FIG. 4 is a transverse sectional view of the base member and slidable clip taken on the line 4—4 of FIG. 3.

Referring now to the drawing, there is shown a generally rectangular base member 10 having a generally rectangular hollow core or interior 12. The base member 10 may be cast from aluminum or the like, may be molded from a synthetic material such as "Bakelite" or can be a metal stamping. The ends of the base member may be rounded or reduced in thickness as indicated at 14 to give a decorative effect, and an aperture or hole 16 for receiving screws 18 (FIG. 3) or the like for mounting the base member on a wall or display panel 20 is provided in each end of the base member. The base member 10 is also provided with a boss 22 extending into its hollow interior 12 adjacent the upper end, and with a longitudinal slot 24 communicating with the hollow interior or recess. The boss 22 is provided with a plurality of threaded openings 26, three in the illustrated embodiment, adapted to receive a screw 28 for adjustably but fixedly mounting a spring clip or flexible keeper 30 on the upper end of the base member.

The spring clip or flexible keeper 30 is provided with loop-like tongue portions 32 (FIG. 1) adapted yieldably to receive one end or tongue of a reel base plate 34 (FIG. 3) of any transverse contour or shape, the base plate 34 and its attached reel 36 being indicated by dash-lines in FIG. 3. The clip 30 is also provided with a depressed portion 38 adapted to be received within a depressed portion 40 provided on the base member 10 above the boss 22 properly to position the clip on the base member. The clip 30 is also provided with an opening 42 adapted to receive the screw 28 adjustably but securely to clamp the clip 30 on the base member.

A second spring clip or flexible keeper loop 44 adapted yieldably to receive and to clamp the lower end or tongue of the reel base plate 34 having any transverse contour or shape is provided with a leg or inwardly projecting portion 46 adapted to be received and to slide within the slot 24 of the base member. Clip or loop 44 is also provided with a looped or circular handle portion 48, and the leg 46 is provided with an aperture 50 adapted to receive one end of two coil springs 52 positioned within the hollow interior are recess of the base member 10. The other ends of the coil springs 52 are adapted to be received within two holes 54 formed or otherwise provided in the upper portion of the base member, the upper ends of the springs 52 being provided with laterally extending portions 56 (FIG. 1) adapted to be received within the holes 54.

It will be apparent from the foregoing description that the second or lower spring clip or keeper 44 is not only flexible but is rockably, as well as slidably, mounted in the slot 24 so as readily to accommodate it to the contour of reel base plates of different shapes and sizes and also to permit easy sliding of the keeper in slot 24. This rocking motion also provides for positively and securely clampign the lower end of the reel base plate on the base member 10, the clip or keeper loop 44 being canted or tilted by the upward pull of the springs 52 on the leg 46, as shown in FIG. 3, securely to lock the reel base plate in position on the bracket. The upper end 24A of slot 24 (FIG. 3) is also tapered upwardly and inwardly so as similarly to cant or tilt the clip 44 at the upper end of its travel in the slot positively to clamp or lock a reel base plate having a straight or flat tongue. It will also be apparent that lower clip 44 can be readily slid downwardly in the slot 24 by handle portion 48 detachably to receive the base plate 34 of a reel 36.

The springs 52 may be made from stainless or other spring tempered steel, and may comprise a single spring attached at its center to leg 46 of clip 44. By adjusting the position of the upper spring clip or keeper 30 on the base member 10 by means of holes 26 and screw 28, reel base plates of various lengths can be accommodated or the reel can be centered on the bracket. The lower spring clip or keeper 44 can be simply and easily formed from a single strip of flexible material by bending the strip to form the two halves of the leg portion 46, the loop portion 44 for receiving the reel plate tongue, and the loop or substantially circular handle portion 48, as shown in FIGS. 1 and 4.

It will further be evident that various changes, alterations and modifications may be made in the illustrated and described embodiment of the invention without departing from the spirit thereof, and it is intended that the invention be limited only by the scope of the appended claims.

What is claimed is:

1. In a bracket for mounting a fishing rod, reel or the like on a display panel or wall, the combination of a base member having a longitudinally extending slot, a first keeper member adapted to receive and to clamp one tongue of a reel base plate, means for adjustably mounting said first keeper member on said base member in alignment with said slot, a second keeper member slidably mounted on said base member, said second keeper member including a spring clip having a rearwardly projecting leg portion and forwardly projecting looped portions thereon, said looped portions being adapted to yieldably receive a reel plate tongue therethrough and providing a handle for manually moving said second keeper, said leg portion being slidably received within said slot, and spring means on said base member and connected to said base and said second keeper member for resiliently urging said second keeper member towards said first keeper member.

2. A reel mounting bracket as set forth in claim 1 in which said first keeper member comprises a flexible spring clip adapted yieldably to receive and to clamp reel base plate tongues having different shapes and contours.

3. A reel mounting bracket as set forth in claim 1 in which said second keeper member comprises a single strip of flexible material bent to form said leg portion, said looped portions comprise a first loop portion adapted to receive a reel plate tongue, and a second loop portion providing a handle for manually moving the keeper.

4. A reel mounting bracket as set forth in claim 1 in which said second keeper member is rockably as well as slidably received in said slot, thereby to cant under action of said spring means positively to clamp said reel base plate tongue.

5. A reel mounting bracket as set forth in claim 1 in which said spring means comprises two portions arranged in a V-shape within and generally parallel to an elongated recess provided in the base member.

6. A reel mounting bracket as set forth in claim 1 in which said base member is provided with a hollow recessed portion on its underside, said slot communicates with said hollow recessed portion, said leg portion of said second keeper member extends through said slot into said hollow recess, and said spring means is positioned within said hollow recess.

7. A reel mounting bracket as set forth in claim 11 in which the end of said slot adjacent said first keeper member is tapered to effect canting of said second keeper member under action of said spring means, thereby to clamp a reel plate tongue of substantially straight, flat contour.

References Cited

UNITED STATES PATENTS

| 2,235,839 | 3/1941 | McEnery. | |
| 2,566,656 | 9/1951 | David | 248—310 X |
| 2,577,044 | 12/1951 | Steinau | 248—226 X |
| 2,713,471 | 7/1955 | Mirsch | 248—310 XR |
| 2,998,885 | 9/1961 | Surface | 248—316 XR |

FOREIGN PATENTS

| 736,565 | 9/1932 | France. |
| 8,582 | 1891 | Great Britain. |

ROY D. FRAZIER, *Primary Examiner.*

R. P. SEITTER, *Assistant Examiner.*

U.S. Cl. X.R.

43—22

UNITED STATES PATENT OFFICE
CERTIFICATE OF CORRECTION

Patent No. 3,433,446                          March 18, 1969

George A. Meder

It is certified that error appears in the above identified patent and that said Letters Patent are hereby corrected as shown below:

Column 2, line 51, "are" should read -- or --. Column 4, line 23, claim reference numeral "11" should read -- 6 --; line 35, "Mirsch" should read -- Hirsch --.

Signed and sealed this 14th day of April 1970.

(SEAL)
Attest:

Edward M. Fletcher, Jr.                      WILLIAM E. SCHUYLER, JR.
Attesting Officer                              Commissioner of Patents